March 6, 1956 R. H. VARIAN ET AL 2,737,356

RADIO CONTROLLED PROJECTILES

Filed May 3, 1945 6 Sheets-Sheet 1

INVENTOR
RUSSELL H. VARIAN
WILLIAM W. HANSEN
BY Herbert H. Thompson
THEIR ATTORNEY INVENTOR
RUSSELL H. VARIAN
WILLIAM W. HANSEN
BY Herbert H. Thompson
THEIR ATTORNEY INVENTOR
RUSSELL H. VARIAN
WILLIAM W. HANSEN
BY Herbert H. Thompson
THEIR ATTORNEY INVENTOR
RUSSELL H. VARIAN
WILLIAM W. HANSEN
BY Herbert H. Thompson
THEIR ATTORNEY INVENTOR
RUSSELL H. VARIAN
WILLIAM W. HANSEN
BY Herbert H. Thompson
THEIR ATTORNEY

RADIO CONTROLLED PROJECTILES

Filed May 3, 1945 6 Sheets-Sheet 6

INVENTORS
RUSSELL H. VARIAN
WILLIAM W. HANSEN
BY Herbert H. Thompson
THEIR ATTORNEY 2,737,356

RADIO CONTROLLED PROJECTILES

Russell H. Varian and William W. Hansen, Garden City, N. Y., assignors to Sperry Rand Corporation, a corporation of Delaware Original application July 8, 1941, Serial No. 401,474, now Patent No. 2,414,102, dated January 14, 1947. Divided and this application May 3, 1945, Serial No. 591,724

9 Claims. (Cl. 244—14)

This invention relates, generally, to the use of ultra-high frequency radio waves for controlling bombs and other explosive missiles such as rocket projectiles, shells, etc., after the same have been discharged from their releasing or projecting apparatus and during flight. This application is a division of application Serial No. 401,474, filed July 8, 1941, for Apparatus for Controlling a Missile in Flight, now U. S. Patent No. 2,414,103, issued January 14, 1947, U. S. Patent No. 2,629,289 is a continuation-in-part of U. S. Patent No. 2,414,103.

Owing to the constantly increasing height at which military aircraft navigate, it is highly desirable to control explosive missiles such as bombs, aerial torpedoes, shells, etc., after they have left the airplane or the ground as the case may be, in order to correct for the initial sighting errors and other errors including drift errors due to variation of side winds at varying altitudes. Thus, in bombing a target on the ground from an airplane, initial errors present at the time of the release of the bomb are generally augmented by the variations of the bomb trajectory due to such things as wobbling of the bomb, variation in the wind direction and speed with changing altitude or change in the speed or direction of movement of a moving target.

The principal object of the present invention is to provide novel apparatus for controlling bombs, or other explosive missiles such as rocket projectiles, aerial torpedoes, shells, etc., after the same have started their courses and in continuing such control until the target is actually reached by the missiles whereby the latter are caused to hit the target or to explode at substantially their nearest approach thereto.

Another object of the present invention is to provide an ultra-high frequency transmitter adjacent the point at which the bomb or other missile is released, the missile being equipped with suitable ultra-high frequency radio receiving apparatus and a servo-mechanism controlled therefrom for effecting the transverse movement of the missile in accordance with signals received from the transmitter.

Still another object of the present invention lies in the provision of ultra-high frequency radio transmission means adapted to transmit a plurality of beams of either unmodulated or modulated carrier frequency, which beams are adapted to be projected at the missile for controlling the latter in its movement toward the target, any transverse movement of the missile with respect to the beams serving to initiate the movement of the servo-mechanism for effecting desired transverse movement of the missile to direct the same toward the target.

A feature of the present invention lies in the provision of radio transmission means adapted to project a plurality of high frequency electromagnetic beams each being slightly divergent with respect to a common axis and differently modulated with respect to each other.

Another feature of the present invention resides in the provision of an apparatus for directing a missile toward a target wherein a plurality of divergent, partially overlapping differently modulated high frequency electromagnetic beams are projected toward the missile on which there are provided means for receiving and demodulating the beams and servo means actuated by the output of the demodulating means for guiding the missile to the target.

Still another object of the present invention is to provide means for moving the transmitted beams angularly for the purpose of shifting the missile transversely of its path, such angular movement of the projected beams being controlled either by optical means as during periods of good visibility or by radio scanning means as during bombing through the overcast.

Another object of the invention is to provide means for preventing rotation of the missile about its trajectory, such means comprising a gyroscope for detecting and immediately rectifying turning of the missile about its longitudinal fore and aft axis and the invention incorporates means sensitive to the polarization of the received electromagnetic radiation for correcting turning movement of the missile with respect to the plane of polarization.

The invention in another of its aspects relates to novel features of the instrumentalities described herein for achieving the principal objects of the invention and to novel principles employed in those instrumentalities, whether or not these features and principles are used for the said principal objects or in the same field.

A further object of the invention is to provide improved apparatus and instrumentalities embodying novel features and principles, adapted for use in realizing the above objects and also adapted for use in other fields.

Other objects and advantages will become apparent from the specification, taken in connection with the accompanying drawings wherein the invention is embodied in concrete form.

In the drawings.

Similar characters of reference are used in all of the above figures to indicate corresponding parts.

Figures 1, 2, 6:
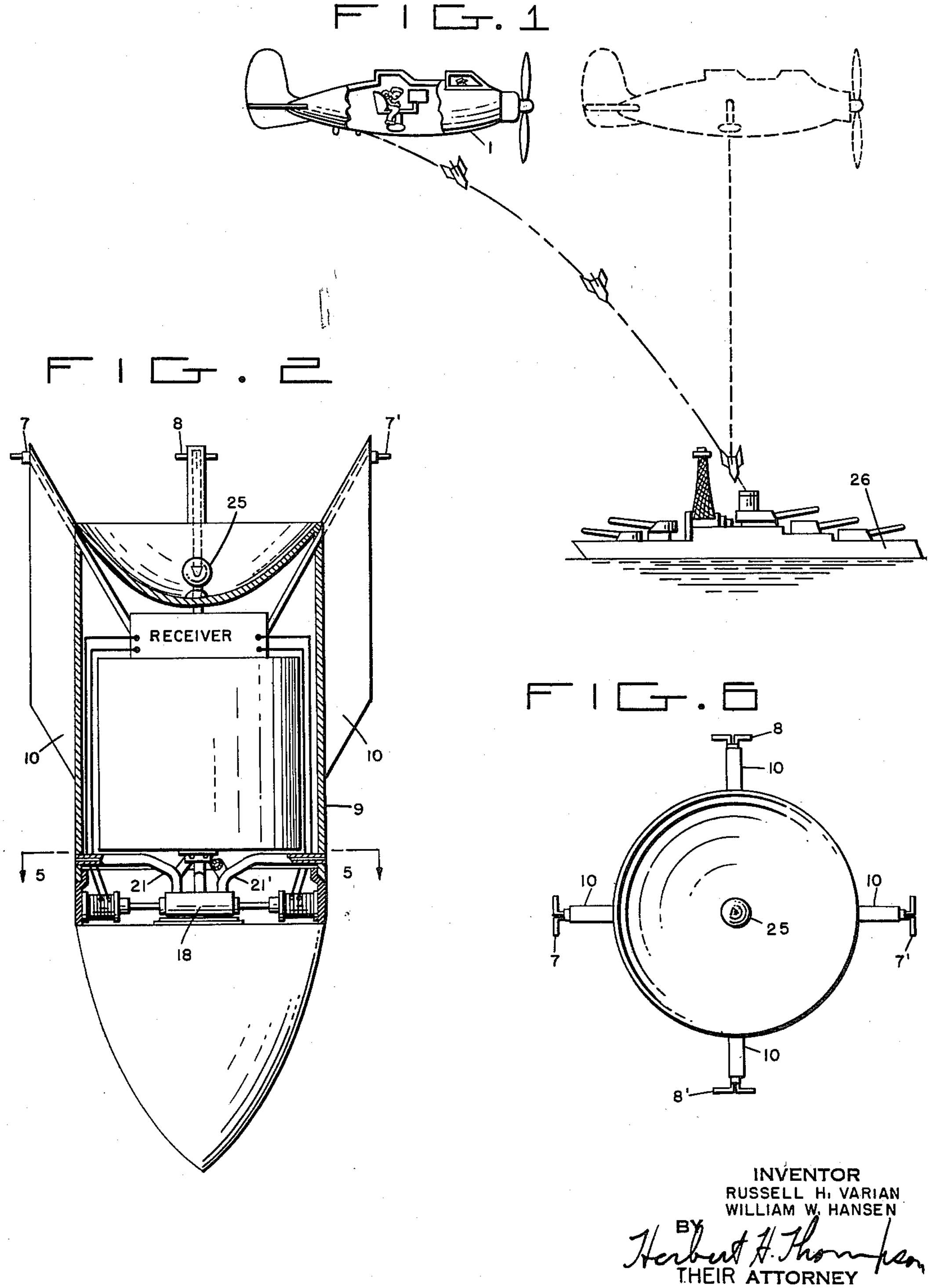
Fig. 1 is a schematic view illustrating one use of the apparatus of the present invention employing a single beam of pure carrier radiation.
Fig. 2 is, in part, a sectional view of a missile equipped with a position sensitive receiver and servo-mechanism.
Fig. 6 is a plan view of the structure of Fig. 2.
Figure 4:
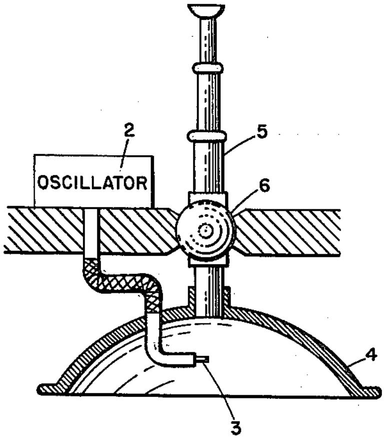
Fig. 4 is a vertical part sectional view of a transmitter optical sighting means.

Referring now to Fig. 1, reference numeral 1 designates an airplane equipped with one form of the transmitter apparatus of the present invention. This craft is adapted to carry an ultra-high frequency oscillator 2 (Fig. 4) as of the type disclosed in Patent No. 2,242,275 of R. H. Varian, dated May 20, 1941, for delivering to an aerial transmitter antenna 3, ultra-high frequency carrier waves of the order of $10^{10}$ cycles per second, such waves being subject to propagation in substantially straight lines and also having the property of penetrating fog, etc. and not being appreciably interfered with by uncontrollable natural phenomena such as radiation from the sun. The antenna 3 is shown provided with a parabolic reflector 4 which has a diameter preferably twenty or more times the wavelength used, whereby this reflector has high resolving power and produces a high directional beam of electromagnetic energy. The reflector 4 and antenna 3 are shown as carried by the lower end of a telescope 5 that has its line of vision coaxial with that of the electromagnetic radiation beam projected from the antenna 3. The telescope 5 is universally mounted as by means of a ball joint 6 so that this telescope and the connected transmitter antenna may be turned to any desired angle.

In the event of bombing through the overcast, the telescope 5 need merely be used as an angular shifting means for turning the antenna 3 and reflector 4, the information used for then directing the beam being obtained from any suitable radio direction and range indicating system. The ultra-high frequency radio output of the transmitter antenna 3 is adapted to be received by four antennae 7, 7', 8, 8' carried by the missile 9, shown in Fig. 2.

As clearly evident from Fig. 6, antennae 7, 7' are spaced an appreciable distance apart as by placing these antennae on the outer edges of opposed fins 10. Similarly, the antennae 8, 8' are spaced appreciably apart as by being located on the outer edges of fins 10 extending at right angles to the plane of fins 10 carrying antennae 7, 7'.

Figure 3:
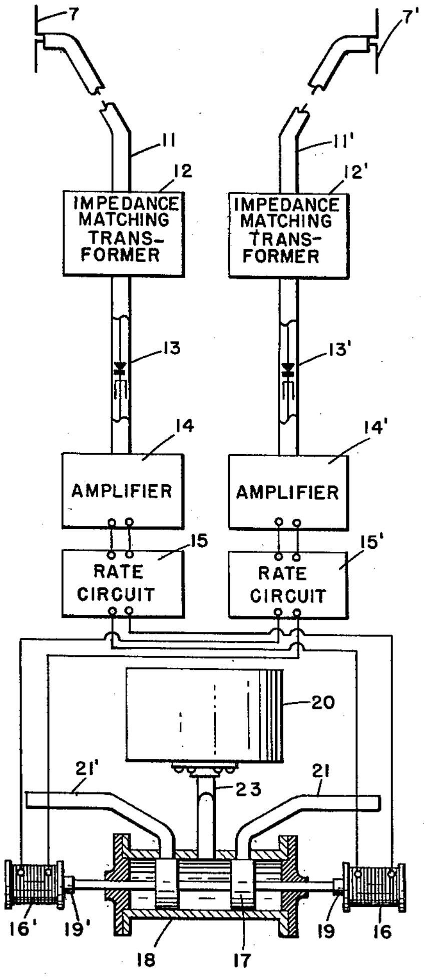
Fig. 3 is a diagrammatic view of the structure of Fig. 2.

In Fig. 3 the antennae 7, 7' are shown as dipoles connected through concentric lines 11, 11' to suitable impedance matching transformers 12, 12' which in turn supply the received energy to crystal detectors 13, 13'. The detected outputs of crystal detectors 13, 13' are supplied to amplifiers 14, 14' the outputs of which are shown supplied through rate circuits 15, 15'. If desired, the rate circuits 15, 15' could be omitted. The outputs of these rate circuits are connected respectively to solenoids 16, 16' arranged for opposite actuation of armatures 19, 19' connected to a piston 17 of a balanced valve 18. The central portion of valve 18 is supplied with compressed air or carbon dioxide gas from a tank 20 through pipe 23. When carbon dioxide is used it may be carried in liquid form in tank 20. Valve 18 has two upper pipes 21 and 21' that have their outer portions extending radially within the cylindrical body of the bomb 9 in opposite directions, the common axis of these portions of the pipes 21, 21' passing preferably through the center of gravity of the bomb. The outer ends of the pipes 21, 21' project through the housing of the bomb for delivering compressed air or carbon dioxide gas in opposite directions diametrically of the bomb. The radial portions of pipes 21 and 21' lie in the vertical plane also containing the spaced antennae 7 and 7'.

Figure 5:
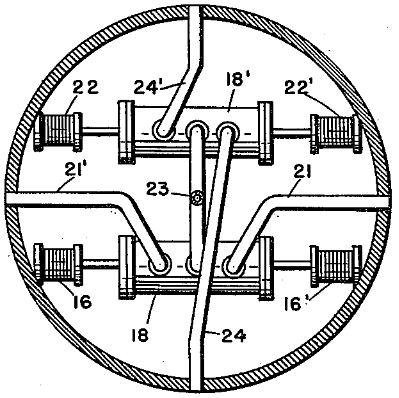
Fig. 5 is a sectional view along line 5—5 of Fig. 2.

The antennae 8 and 8' are similarly connected to a receiver circuit, such as shown in Fig. 3, for controlling the operation of solenoids 22 and 22', shown in Fig. 5, the armatures of these solenoids being employed for operating the balanced valve 18' similar to valve 18, valve 18' controlling the flow of compressed air from the pipe 23 to two outwardly extending pipes 24 and 24' extending through the wall of the bomb 9 for directing air or carbon dioxide blasts in diametrically opposite directions. The radial portions of pipes 24 and 24' lie in the plane of antennae 8, 8'.

In use, preferably a suitable bomb sight is provided on the aircraft such as that disclosed in Patent No. 2,162,698, dated June 20, 1939, and is employed for releasing the bomb 9 at the proper time and in the proper direction for hitting the target desired. After releasing the bomb and before the same has reached its target the bombardier looks through the telescope 5 and observes the falling bomb. To aid him in observing the bomb, the same may be provided with a lamp 25, if desired. Inasmuch as the forward velocity of the bomb decreases gradually after release thereof due to air friction the bombardier would ordinarily direct the pilot to reduce speed so that the aicraft flies over the target at about the same time as the predicted time for the bomb to strike the same. This change in speed of the airplane makes the same an extremely difficult target to hit from a point such as the ship 26 inasmuch as all predictions are based upon the craft maintaining a fixed speed.

It is preferable for the bombardier to keep the target or point in sight through the telescope 5 as the bomb falls. As the bomb approaches the target, the latter moves into the field of vision of the bombardier looking down through the telescope 5 although the target is probably not in the central line of sight of the telescope at this time. If the oscillator 2 is now turned on producing a pencil beam of ultra-high frequency electromagnetic radiation the field intensity of any cross section of which is greatest at the center of the beam and tapers off in substantially the fashion shown in Fig. 3A to the side edges thereof, the bomb will ordinarily line itself up with the center of the beam. Assuming that the bomb is not initially lined up with the center of the beam then due to the varying field intensity of the beam across its cross section one of the antennae 7 or 7', for example, will receive more energy than the other, so that the output of amplifier 14, for example, will be made greater than that of amplifier 14', whereby solenoid 16 is energized to a greater extent than solenoid 16' so that the balanced valve 17 is moved to uncover pipe 21 thereby causing tank 20 to discharge compressed air or gas through valve 18 and pipe 21 and effecting a movement of the bomb toward the center of the radiating beam, i. e., toward the left in Fig. 3A. Similarly, if antenna 8, for example, should receive more energy than antenna 8' it would act to shift the bomb transversely in the plane of these antennae to bring the bomb into the central axis 27 of the radiating beam corresponding to the center of the line of sight of the telescope 5. As the bomb projectile is about to strike the target the bombardier gradually shifts the telescope 5 angularly so as to bring his line of sight and hence the bomb into the direct line of the target so that the latter will be hit as desired.

Figure 3A:
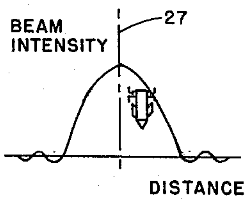
Fig. 3A is a graph illustrating the system of Figs. 1 to 5.
Figure 7:
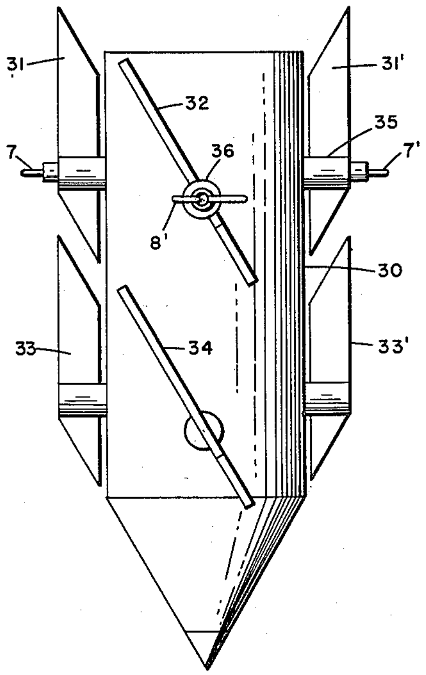
Figs. 7 to 10 are elevational, vertical sectional, schematic and transverse sectional views of a somewhat modified form of a bomb or projectile.
Figure 8:
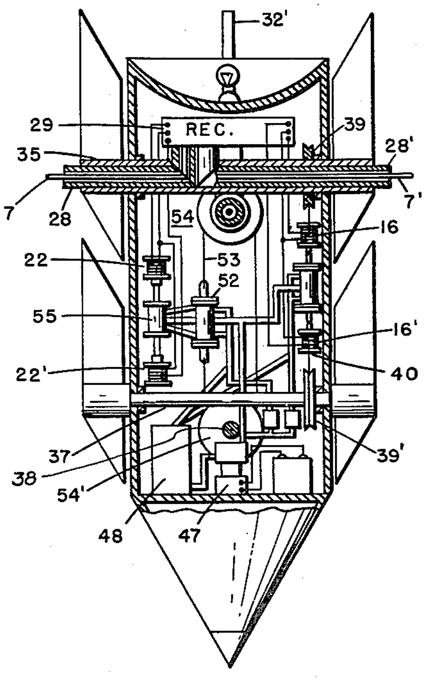
Figure 9:
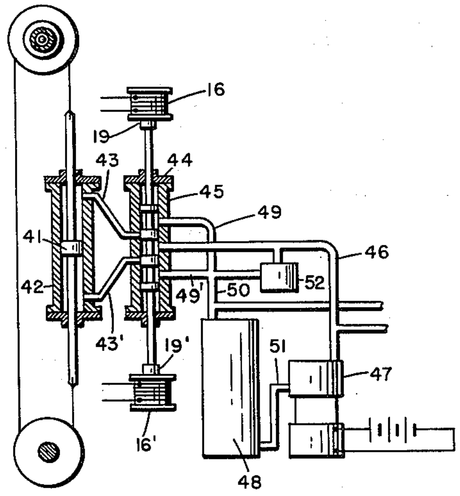
Figure 10:
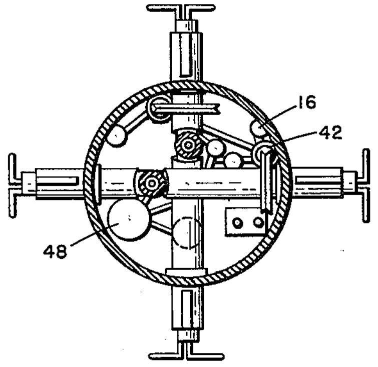

It will be noted from Fig. 3A that as long as the bomb is lined up with the center of line 27 of the radiating electromagnetic beam, the antennae 7, 7' and 8, 8' will receive equal intensity of signal so that the balanced valves 18, 18' will be held in their neutral positions so that the outputs of the various amplifiers will be equal. Should the bomb commence to move out of the center of the beam the antennae will receive signals of unequal strength resulting in the operation of the servo-mechanism and the movement of the bomb transversely back into the center of the radiating beam. Owing to the high pressure of the air or gas within the tank 20 and to the fact that the period of time of flight of the bomb is short, the flow of air or gas through pipes 21, 21' and 24, 24' is quite rapid so that the reaction force of the jets issuing from these pipes is large, thereby resulting in an immediate response of the projectile to any deviation of the same from the path of the beam effecting a rapid return of the projectile to the beam. Should the bombardier move his telescope 5 angularly too rapidly so as to lose the bomb he can always turn the same back and pick the bomb up again.

If desired, instead of using the reaction forces of air jets for controlling the transverse movement of the projectile the same may be controlled by movable fins, as shown in Figs. 7 to 10. In these figures the bomb 30 is shown provided with four upper fins placed 90° apart around the periphery of the bomb and with four lower fins similarly spaced. Diametrically opposite upper fins 31, 31' are fixed upon the ends of a turnable transverse tubular shaft 35 extending through the bomb housing and in these figures, antennae 7 and 7' are shown connected to concentric lines 28 and 28' that conduct the energy similarly to lines 11, 11' of Fig. 3 to the receiver apparatus 29 similar to the receiver of Fig. 3.

Similarly, the diametrically opposite upper fins 32 and 32' are fixed upon the ends of a turnable transverse tubular shaft 36 that extends through the housing of the bomb. The antennae 8 and 8' in this case feed energy through concentric lines contained within shaft 36 to the receiver 29.

The opposite fins 33 and 33' and the fins 34 and 34' at the lower portion of the bomb are mounted upon shafts 37 and 38, respectively, the shafts also extending through the bomb and being turnably mounted in the housing thereof. Pulleys 39 and 39' are fixed upon shafts 35 and 37 and have a cable 40 passing thereover, this cable being passed one or more times about each of these pulleys, the ends of this cable being connected by piston rods to the opposite sides of a hydraulic or pneumatically operated piston 41 (see Fig. 9) working within a servo cylinder 42 connected to be supplied with working pressure fluid by means of pipes 43 and 43' extending to a balanced piston valve casing 44 within which a balanced piston valve 45 is movable by means of the armatures 19 and 19' operated from solenoids 16 and 16' as explained in connection with Figs. 1 to 5.

Fluid pressure is supplied to the valve casing 44 through a pipe 46 from a pump 47. The pressure fluid returned from casing 44 passes into branch pipes 49 and 49' leading to pipe 50 connected to the reservoir or sump 48, which, in turn, is connected by pipe 51 to the pump 47. A by-pass valve 52 is provided for by-passing fluid pressure when the servo motor is not operating. The fins 32 and 32' and fins 34 and 34' are also adapted to be operated by a servo motor 52', actuating a cable 53 passing around pulleys 54 and 54' fixed upon shafts 36 and 38. The master control valve 55 for controlling the flow of pressure fluid to the servo motor 52' is actuated by the armatures of solenoids 22 and 22' as in Figs. 1 to 5. Master valve 55 is connected to be supplied with pressure fluid from the pump 47.

In use, any departure of the projectile from the center of the radiated beam will cause the proper control valve 45 or 55, as the case may be, to be operated from the solenoids 16, 16' or 22, 22' to effect the supply of fluid from pump 47 through pipes 43 or 43' as the case may be to operate piston 41 in the proper direction to so move vanes 31—31', 33—33', or 32—32', 34—34' so as to bring the bomb back into the central portion of the base, whereupon the deflected vanes will again be straightened or aligned with the longitudinal axis of the bomb.

The form of radio controlled missile adapted to be steered in accordance with the directivity of a single highly directive beam of high frequency electromagnetic energy and its control system, as hereinabove described, is claimed in the above-mentioned copending application Serial No. 401,474.

In the form of the invention shown in Figs. 11, 13, 14 and 15 the ultra-high frequency oscillator 2' has its output connected through a concentric line 58 to a distributing device 59. This distributing device is driven by motor 60 and serves to supply the output energy of oscillator 2' to four concentric lines 61 to 64 successively, and in repeated sequence, which lines are connected to four antennae 65 to 68, respectively. Antennae 65 and 67 lie on diametrically opposite sides of the focus of a parabolic reflector 69 and, similarly, antennae 66 and 68 lie on diametrically opposite sides of the focus of this reflector, these antennae being spaced 90° apart angularly about the axis of the reflector.

Figure 11:
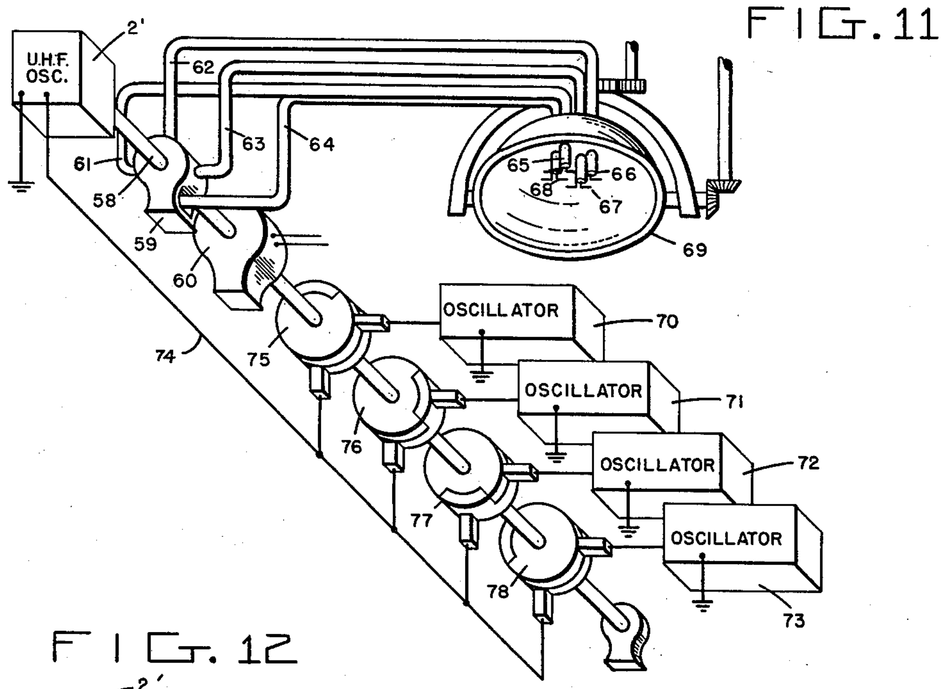
Fig. 11 is a wiring diagram illustrating a modified form of the invention employing a plurality of modulated projected beams.
Figure 11A:
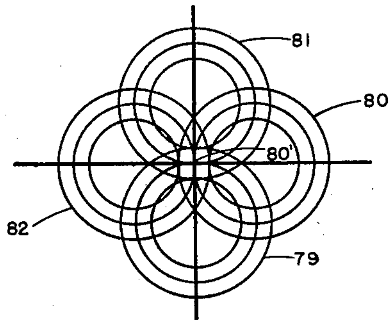
Fig. 11A is a graph illustrating the disposition of the fields of the beams produced by the transmitter of Fig. 11.

The ultra-high frequency oscillator 2' has its output modulated at successively different frequencies supplied by oscillators 70, 71, 72 and 73 and in continuously repeated sequence. This oscillator may be of the type mentioned in connection with oscillator 2 and is provided with modulating means such as disclosed in application Serial No. 201,898, filed April 14, 1938, by R. H. Varian and W. W. Hansen, now Patent No. 2,280,824, issued April 28, 1942, which modulating means is excited through lead 74 connected connected to common brushes engaging commutators 75 to 78. The other brushes of commutators 75 to 78 are connected respectively to oscillators 70 to 73. Each of these oscillators is adapted to supply energy to the modulating means of oscillator 2' during a respective one-quarter of each revolution of the motor 60 whereby, when antenna 65 is excited, for example, the beam radiated thereby will be modulated by the output of oscillator 70 and the next moment antenna 66 will be excited and its output will be modulated by the output of oscillator 71, etc. Thus, due to the location of these several antennae at the sides of the focus of reflector 69, four overlapping beams of electromagnetic radiation are produced as shown in Fig. 11A. In this figure, beam 79, for example, is produced by antenna 65, beam 80 is produced by antenna 66, beam 81 by antenna 67 and beam 82 by antenna 68, the several annular equi-signal lines making up each of these beams in cross section taken successively indicating progressively changing signal strength. The reflector 69 is adapted to be oriented universally so as to direct the same toward the target and this equipment may be mounted either on the plane, as shown in Fig. 1, as where it is employed for controlling the trajectory of a bomb or this equipment may be mounted on the ground as where the same is employed for controlling the trajectory of a shell or rocket projectile.

Figure 13:
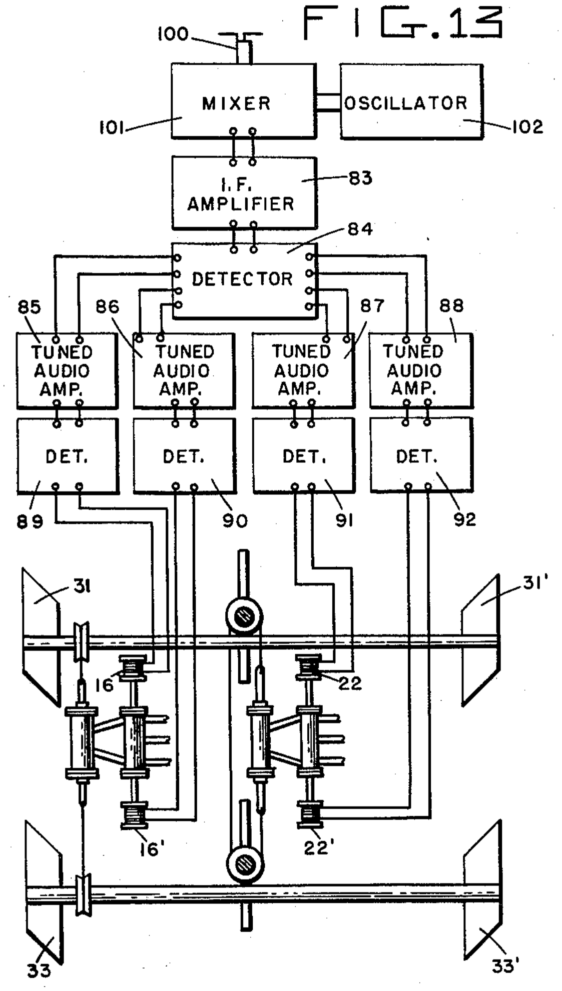
Fig. 13 is a wiring diagram of the projectile structure having means for differentiating between the different beams of Fig. 11 and utilizing such modulations for controlling the servo-mechanism for transversely actuating the projectile.
Figure 15:
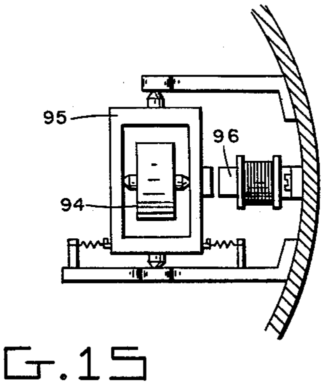
Fig. 15 is a fragmentary detail plan view of a portion of the structure of Fig. 14.
Figure 14:
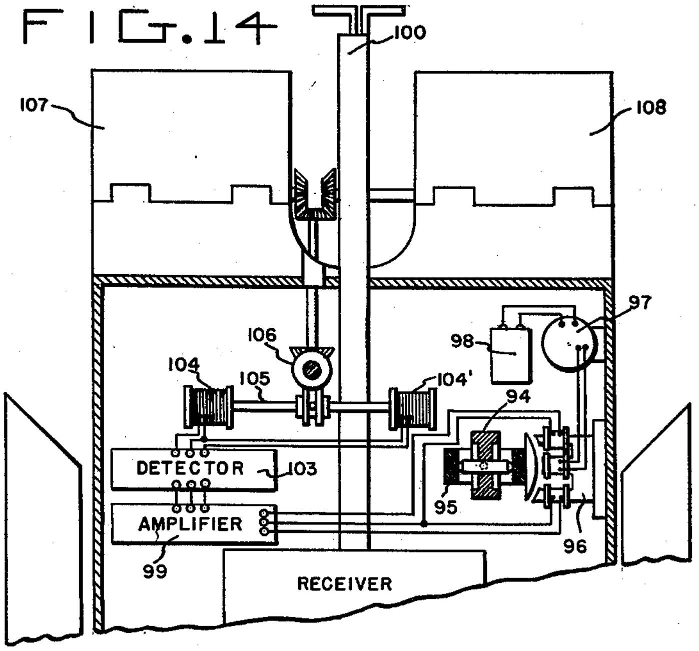
Fig. 14 is a vertical sectional view of a projectile showing apparatus for preventing the turning thereof about its trajectory.

The receiving equipment on the projectile is shown in Figs. 13 to 15 and comprises an antenna 100 feeding a mixer 101 wherein the received signal is mixed with that of a local ultra-high frequency oscillator 102, the beat frequency being fed to an intermediate frequency amplifier 83, the output of which is detected in detector 84. Detector 84 has four outputs inasmuch as four beams are employed each modulated at a separate frequency, these outputs being respectively supplied to audio amplifiers 85 to 88, the outputs of which are detected by detectors 89 to 92. The outputs of said detectors 89 and 90 are responsive to the signals picked up from beams 79 and 81, respectively, for example, whereas the outputs of detectors 91 and 92 are responsive to the signals picked up from beams 80 and 82 respectively. The outputs of detectors 89 and 90 are shown connected to solenoids 16 and 16', as in Figs. 7 to 10, and similarly the outputs of detectors 91 and 92 are connected to solenoids 22 and 22', as in Figs. 7 to 10. Thus, should the energy picked up by antenna 100 from beam 79 exceed that picked up by this antenna from beam 81, the vanes 31—31' and 33—33' are actuated to move the bomb transversely so that its flight path coincides with the axis of symmetry 80' of all four beams 80 to 82. Similarly, should antenna 100 pick up more energy from beam 80 than that picked up by this antenna from beam 82, the vanes 32—32' and 34—34' are actuated to move the bomb transversely so that its flight path coincides with the axis of symmetry 80′ of all four beams shown in Fig. 11A.

It is essential in this form of the invention that the bomb or other projectile should not turn about the axis 80′ of the four beams or otherwise the signal received may drive the bomb away from the center of the beam instead of towards the same. To accomplish this a constrained gyroscope may be employed as shown in Figs. 14 and 15. This gyroscope comprises a rotor 94 rotating about an axis extending at right angles to the longitudinal axis of the bomb, said rotor being carried by a gimbal ring 95 having pivotal supports at right angles to the rotating axis of the rotor 94. Thus, as shown in Fig. 14, should the bomb start to turn about its longitudinal axis and hence about the axis 80′ in Fig. 11A the gyro wheel 94 will precess up or down in Fig. 14 depending upon the direction of such rotation of the bomb. A three-legged electric pick-off 96 is employed in conjunction with the gyroscope, said pick-off having a center leg energized from an A.-C. motor generator set 97 supplied from a battery 98. The outputs of the windings of the outer legs of pick-off 96 are amplified in amplifier 99 and detected in detector 103 and these outputs are then applied to solenoids 104 and 104′ acting in opposition upon an armature 105 which in turn acts through gearing 106 to turn vanes 107 and 108 in opposite direction thereby correcting any tendency of the bomb or projectile to turn about the axis 80′.

Figure 12:
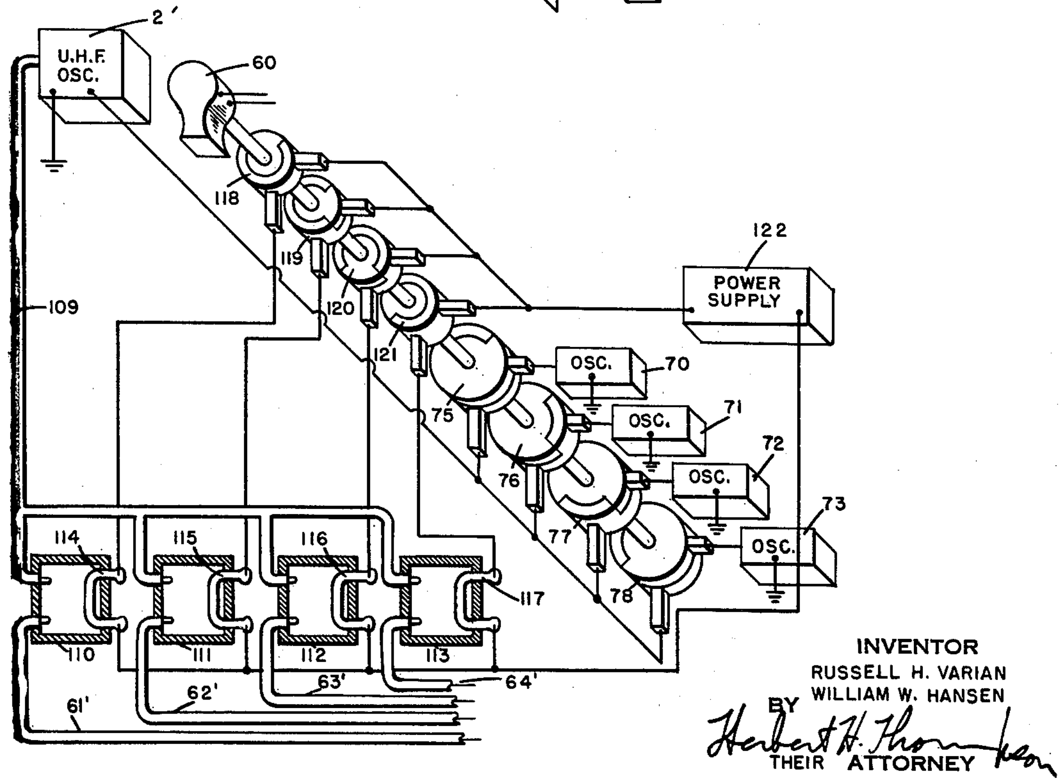
Fig. 12 is a view similar to Fig. 11 of a somewhat modified construction.

Fig. 12 shows a somewhat modified form of transmitting apparatus. In this figure, the output of the ultra-high frequency oscillator 2′ is supplied through concentric line 109 to a plurality of hollow resonators 110 to 113 which resonators in turn are coupled to output lines 61′, 62′, 63′ and 64′ leading to the four radiating antennae such as 65, 66, 67 and 68 of Fig. 11 (not shown in Fig. 12). Three-fourths of the time each of the resonators 110 to 113 is detuned by use of gas discharge tubes such as neon tubes 114 to 117. This is accomplished through use of commutators 118 to 121 driven from the rotor 60. Thus, in the case of resonator 110, the associated neon tube 114 is energized from the power supply 122 through commutator 118 and the leads shown during three-quarters of every revolution of the commutator 118, but during the remaining one-quarter of each revolution of this commutator however, i. e., during the interval that oscillator 70 is employed for modulating the output of oscillator 2′ one brush of commutator 118 is moving over the insulating portion of the commutator 118 so that neon tube 114 is deenergized allowing resonator 110 to resonate at the output frequency of oscillator 2′ so that this resonator passes energy on through lead 61′ to the connected antenna 65. Similarly, the resonators 111, 112 and 113 pass energy to their respective lines 62′, 63′ and 64′ during their respective one-quarter signal periods so that each of the antennae 65 to 68 receive the modulated energy in desired sequence. In other words, the use of the resonators 114 to 117 and associated parts in Fig. 12 takes the place of the distributor 59 used in Fig. 11.

Figure 17:
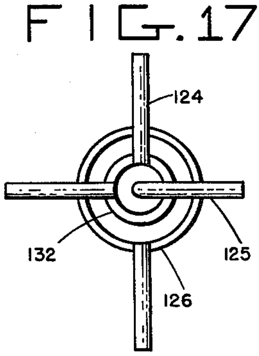
Fig. 17 is a plan view of the antenna structure of Fig. 16.
Figure 16:
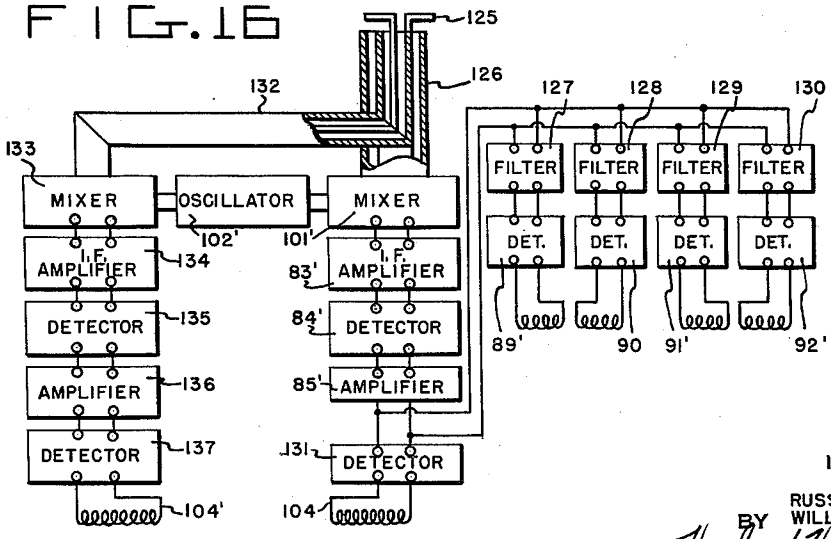
Fig. 16 is a wiring diagram of a modified projectile structure incorporating means for preventing turning of the projectile with respect to the plane of polarization of the projected beams.

In the form of the invention shown in Figs. 16 and 17, two dipole antennae 124 and 125 extending at right angles to each other, as better shown in Fig. 17, are employed on the bomb or projectile. In this system the same transmitting apparatus as shown in Fig. 11 or 12 may be used. Antenna 124 is connected through concentric line 126 to a mixer 101′ similar to the mixer 101 in Fig. 13 which mixer serves to mix the output of a local oscillator 102′ with the signal received by antenna 124. The beat frequencies are amplified in the intermediate amplifier 83′ and detected in detector 84′, the output of which is amplified in amplifier 85′ and passed to the several filters 127, 128, 129 and 130 each of which selects a particular modulation frequency just as was accomplished by the tuned audio amplifiers 85 to 88 of Fig. 13. Thus, filters 127 and 128 pass the modulations supplied by beams 79 and 81, respectively, of Fig. 11A, whereas filters 129 and 130 pass the modulations of beams 80 and 82, respectively. The filter outputs are detected in detectors 89′, 90′, 91′ and 92′ as in Fig. 13 and the detected outputs employed for moving the projectile transversely to maintain the axis of the same coincident with the axis 80′ of Fig. 11A.

It will be noted that the output of amplifier 85′ is also detected in a detector 131 for application to a coil 104 similar to the corresponding coil in Fig. 14. The output of antenna 125 is fed through concentric line 132 to the mixer 133 wherein the signal is mixed with the output of oscillator 102′ and the beat frequency is amplified in intermediate amplifier 134, detected in detector 135 and further amplified in amplifier 136 and then detected in detector 137, the output of which is fed to coil 104′ similar to the corresponding coil in Fig. 14. Thus, the output of antenna 124 after amplification and detection is opposed against that of antenna 125 so that with these outputs unequal the projectile will be turned by fins 107 and 108 until these outputs are made equal at which time antennae 124 and 125 extend at 45° with respect to the plane of polarization of the waves emitted from antennae 65 to 68 of Fig. 11, bearing in mind that all these antennae have parallel planes of polarization. Thus, should the projectile tend to turn with respect to the plane of polarization of the emitted waves, the signal output of one of the antennae 124 or 125 will increase and that of the other antenna will decrease resulting in the operation of the servo-mechanism and movement of vanes 107 and 108 in Fig. 14 to correct such turning movement.

Figure 18:
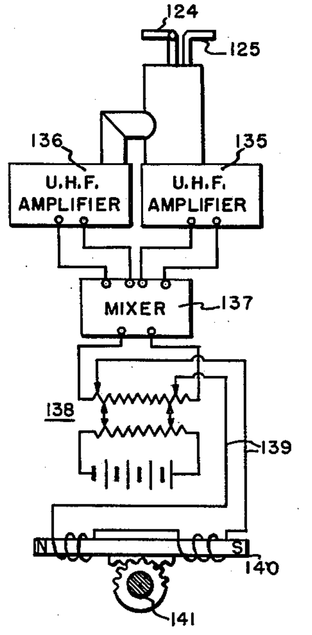
Fig. 18 is a wiring diagram of a somewhat modified arrangement of the means illustrated in Fig. 16.

In Fig. 18 the antenna structure is similar to that shown in Fig. 17, the output of antenna 124 being amplified in ultra-high frequency amplifier 135 and that of antenna 125 being amplified in amplifier 136 after which these signals are mixed in the mixer 137.

A potentiometer 138 is employed for balancing out the steady D. C. component of the output of mixer 137 so that only the variable D. C. components are supplied by this mixer through leads 139 to the polarized servo unit 140. This arrangement operates such that the servo system tends to align one of the antennae 124 or 125, depending on the hook-up, with the plane of polarization, i. e., the plane of the electric vector of the emitted electromagnetic waves. This servo system acts through shaft 141 and gearing 106, for example, in Fig. 14 to turn the vanes 107 and 108 in opposite directions. Any departure of the selected antenna from the plane of polarization will immediately react on servo-mechanism 140 to bring such antenna back to the plane of polarization thereby maintaining the projectile in steady non-rotating flight. However, this system will have a 180° ambiguity which can be corrected for by switching the modulation of each beam of the transmitter of Figs. 11 or 12 to the respective beam opposite thereto. This reversing of the modulation may also be used in connection with the structure of Fig. 16.

The term "missile" is here intended to denote or connote any body capable of being dropped, thrown or projected at a distant target and which may continue on its way toward said target by virtue of its inertia alone or by its inertia together with motive power contained in or on the body.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a system for guiding missiles, the combination comprising a transmitter mounted upon an aircraft and comprising means for sequentially modulating electrical energy in a cyclic manner and means including a universally mounted antenna for radiating the modulated energy in timed relation to its cyclic modulation to provide a plurality of slightly divergent, highly directional beams of distinctively modulated electromagnetic energies whereby each beam is distinguishable from the others and their relative positions in space are determined, said beams occupying positions overlapping in space to define therebetween an equi-signal zone, means for rotating said antenna to change the direction of said equi-signal zone in space relative to said aircraft, control apparatus carried by said missile and comprising antenna means and receiver means connected therewith for segregating the received electromagnetic energies and supplying outputs respectively proportional to the intensities of the transmitted beams at the antenna on said missile, means for controlling the direction of flight of the missile, and differential means for comparing the outputs of the receiver means and for actuating the flight control means in proportion to the difference between such outputs, whereby the missile will automatically seek and follow said equi-signal zone.

2. In a system for guiding missiles, the combination comprising a transmitter mounted upon an aircraft and comprising means for sequentially modulating electrical energy in a cyclic manner and means including a universally mounted antenna for radiating the modulated energy in timed relation to its cyclic modulation to provide a plurality of slightly divergent, highly directional beams of distinctively modulated electromagnetic energies whereby each beam is distinguishable from the others and their relative positions in space are determined, said beams occupying positions overlapping in space to define therebetween an equi-signal zone, means for rotating said antenna to change the direction of said equi-signal zone in space relative to said aircraft, control apparatus mounted on said missile and comprising antenna means and receiver means connected therewith for segregating the received energy and supplying outputs respectively proportional to the intensities of the beams at the antenna on said missile, means for controlling the direction of flight of the missile in a first direction, means for controlling in direction of flight of the missile in a second direction perpendicular to said first direction, a first differential means for comparing the outputs of the receiver corresponding to diametrically disposed beams and for actuating said first flight control means in proportion to the difference between such outputs, and a second differential means for comparing the outputs of the receiver corresponding to the other two diametrically disposed beams and for actuating the second flight control means in proportion to the difference between such outputs, whereby the missile will automatically seek and follow said equi-signal zone.

3. In a system for guiding missiles, the combination comprising a transmitter mounted upon an aircraft and comprising means for sequentially modulating electrical energy in a cyclic manner and means including a universally mounted antenna for radiating the modulated energy in timed relation to its cyclic modulation to provide a plurality of slightly divergent, highly directional beams of distinctively modulated electromagnetic energies whereby each beam is distinguishable from the others and their relative positions in space are determined, said beams occupying positions overlapping in space to define therebetween an equi-signal zone, means for rotating said antenna to change the direction of said equi-signal zone in space relative to said aircraft, control apparatus carried by said missile and comprising antenna means and receiver means connected therewith for segregating the received electromagnetic energies and supplying outputs respectively proportional to the intensities of the transmitted beams at the antenna on said missile, means for controlling the direction of flight of the missile, differential means for comparing the outputs of the receiver means and for actuating the flight control means in proportion to the difference between such outputs, whereby the missile will automatically seek and follow said equi-signal zone, and means for controlling said missile to oppose uncontrolled rotation thereof about its longitudinal axis.

4. In a system for guiding missiles, the combination comprising a transmitter mounted upon an aircraft and comprising means for sequentially modulating electrical energy in a cyclic manner and means including a universally mounted antenna for radiating the modulated energy in timed relation to its cyclic modulation to provide a plurality of slightly divergent, highly directional beams of distinctively modulated electromagnetic energies whereby each beam is distinguishable from the others and their relative positions in space are determined, said beams occupying positions overlapping in space to define therebetween an equi-signal zone, means for rotating said antenna to change the direction of said equi-signal zone in space relative to said aircraft, control apparatus mounted on said missile and comprising a pair of antennae disposed in quadrature relation and receiver means connected therewith for segregating the received energy and supplying outputs respectively proportional to the intensities of the beams at the antenna on said missile, means for controlling the direction of flight of the missile in a first direction, means for controlling the direction of flight of the missile in a second direction perpendicular to said first direction, a first differential means for comparing the outputs of the receiver corresponding to diametrically disposed beams and for actuating the first flight control means in proportion to the difference between such outputs, and a second differential means for comparing the outputs of the receiver corresponding to the other two diametrically disposed beams and for actuating the second flight control means in proportion to the difference between such outputs, and means responsive to the radiated electromagnetic energy for maintaining the orientation of said missile about its longitudinal axis substantially fixed with respect to said beams, whereby the missile will automatically seek and follow said equi-signal zone.

5. In a system for guiding missiles, the combination comprising a transmitter mounted upon an aircraft and comprising means for sequentially modulating electrical energy in a cyclic manner and means including a universally mounted antenna for radiating the modulated energy in timed relation to its cyclic modulation to provide a plurality of slightly divergent, highly directional beams of distinctively modulated electromagnetic energies whereby each beam is distinguishable from the others and their relative positions in space are determined, said beams occupying positions overlapping in space to define therebetween an equi-signal zone, means for rotating said antenna to change the direction of said equi-signal zone in space relative to said aircraft, control apparatus carried by said missile and comprising antenna means and receiver means connected respectively therewith for supplying outputs respectively proportional to the intensities of the beams at the antennae on said missile, means for controlling the direction of flight of the missile including a first control surface for controlling direction of flight in a first direction and a second control surface for controlling flight in a second direction perpendicular to said first direction, a first servo-mechanism for operating the first control surface and a second servo-mechanism for operating the second control surface, a first differential means for comparing the outputs of said receiver corresponding to the signal intensities of a first pair of diametrically disposed beams and for controlling the said first servo mechanism in proportion to the difference between such outputs, a second differential means for comparing the outputs of said receiver corresponding to the signal intensities of the other pair of diametrically disposed beams and for controlling the second servo mechanism in proportion to the difference between such outputs, whereby the missile will automatically seek and follow said equi-signal zone.

6. In a system for guiding missiles, the combination comprising a transmitter mounted upon an aircraft and comprising means for sequentially modulating electrical energy in a cyclic manner and means including a universally mounted antenna for radiating the modulated energy in timed relation to its cyclic modulation to provide a plurality of slightly divergent, highly directional beams of distinctively modulated electromagnetic energies whereby each beam is distinguishable from the others and their relative positions in space are determined, said beams occupying positions overlapping in space to define therebetween an equi-signal zone, means for rotating said antenna to change the direction of said equi-signal zone in space relative to said aircraft, control apparatus carried by said missile and comprising four antennae disposed in quadrature relation and receiver means connected therewith, means for controlling uncontrolled rotation of said missile about its longitudinal axis, a first means for controlling the flight of the missile in a first direction, a second means for controlling the flight of the missile in a second direction perpendicular to the first direction, means for segregating the received energies and supplying outputs respectively proportional to the intensities of the transmitted energies at the antenna on said missile, a first differential means for comparing the outputs of said receiver corresponding to diametrically disposed beams and for actuating said first flight control means in proportion to the difference between such outputs and a second differential means for comparing the outputs of said receiver corresponding to the other pair of diametrically disposed beams and for actuating the second of said flight control means in proportion to the difference between such outputs, whereby the missile will automatically seek and follow said equi-signal zone.

7. In a system for guiding missiles, the combination comprising a transmitter mounted upon an aircraft and comprising means for sequentially modulating electrical energy in a cyclic manner and means including a universally mounted antenna for radiating the modulated energy in timed relation to its cyclic modulation to provide a plurality of slightly divergent, highly directional beams of distinctively modulated electromagnetic energies whereby each beam is distinguishable from the others and their relative positions in space are determined, said beams occupying positions overlapping in space to define therebetween an equi-signal zone, means for rotating said antenna to change the direction of said equi-signal zone in space relative to said aircraft, control apparatus mounted on said missile and comprising antenna means and receiver means connected therewith for segregating the received energy and supplying outputs respectively proportional to the intensities of the beams at the antenna on said missile, means for controlling the direction of flight of the missile in a first direction, means for controlling the direction of flight of the missile in a second direction perpendicular to said first direction, a first differential for comparing the outputs of said receiver corresponding to diametrically disposed beams and for actuating the first flight control means in proportion to the difference between such outputs, and a second differential means for comparing the outputs of said receiver corresponding to the other two diametrically disposed beams and for actuating the second flight control means in proportion to the difference between such outputs, whereby the missile will automatically seek and follow said equi-signal zone, and means for controlling said missile to oppose uncontrolled rotation thereof about its longitudinal axis.

8. A system of the character recited in claim 7 in which the means for controlling the missile to oppose uncontrolled rotation thereof about its longitudinal axis comprises a control surface carried by said missile, a servo mechanism for operating the control surface, a gyroscope, and means including pick-off means associated with said gyroscope for controlling said servo mechanism.

9. A system of the character recited in claim 7 in which the antenna means comprises a pair of antennae disposed in quadrature relation and the means for controlling the missile to oppose uncontrolled rotation thereof about its longitudinal axis comprises a control surface, a servo mechanism for operating said control surface and means responsive to the outputs of said receiver means for controlling said servo mechanism in accordance with the difference in intensities of quadraturally disposed beams at the antenna on said missile.

References Cited in the file of this patent

UNITED STATES PATENTS

| | | |
|---|---|---|
| 1,932,469 | Leib et al. | Oct. 31, 1933 |
| 2,014,825 | Watson | Sept. 17, 1935 |
| 2,082,347 | Leib et al. | June 1, 1937 |
| 2,083,242 | Runge | June 8, 1937 |
| 2,101,785 | Wilckens | Dec. 7, 1937 |
| 2,165,256 | Hansell | July 11, 1939 |
| 2,165,800 | Koch | July 11, 1939 |
| 2,242,910 | Hahnemann | May 20, 1941 |
| 2,388,748 | Kopetzky | Nov. 13, 1945 |
| 2,396,091 | De Bey | Mar. 5, 1946 |
| 2,404,942 | Bedford | July 30, 1946 |
| 2,423,336 | Moseley | July 1, 1947 |

FOREIGN PATENTS

| | | |
|---|---|---|
| 795,953 | France | Jan. 13, 1936 |
| 546,488 | Great Britain | July 16, 1942 |